May 17, 1938.                J. SUNNEN                2,117,525
REAMER
Filed Aug. 22, 1935            2 Sheets-Sheet 1
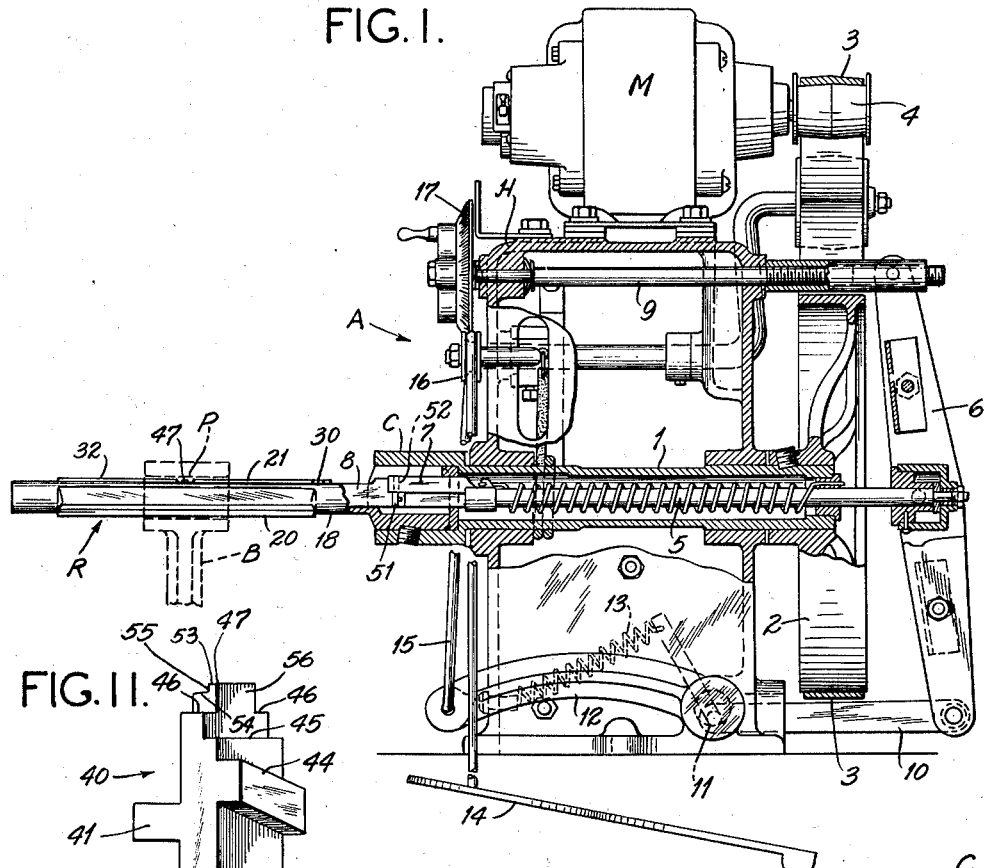

May 17, 1938.  J. SUNNEN  2,117,525
REAMER
Filed Aug. 22, 1935   2 Sheets-Sheet 2
FIG. 4.
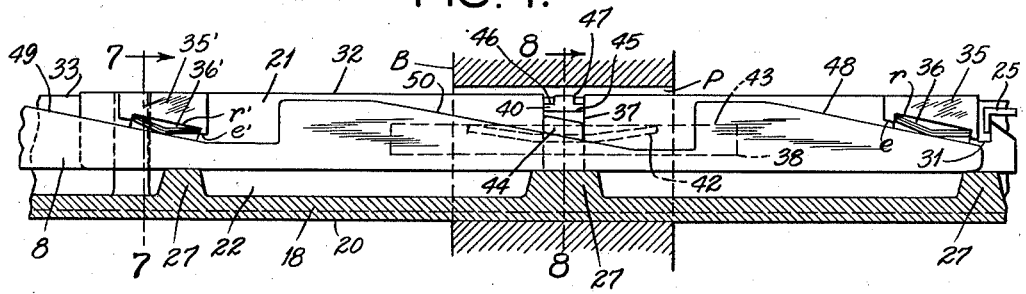
FIG. 5.
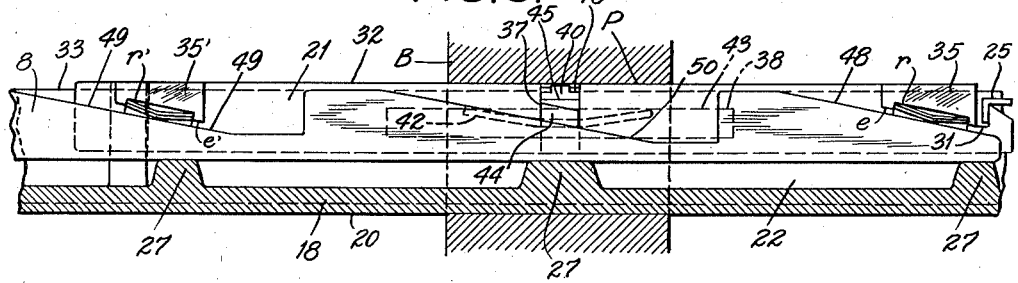
FIG. 6.
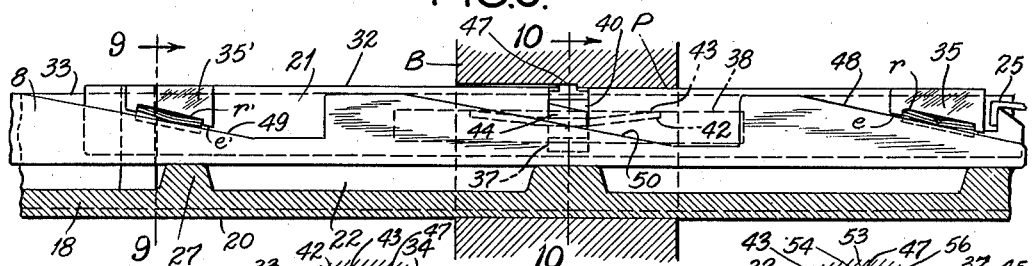
FIG. 8.    FIG. 10.
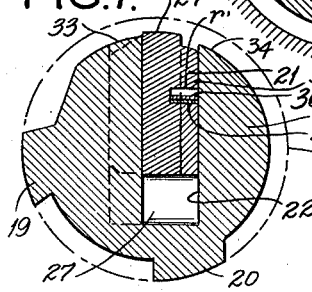
FIG. 7.
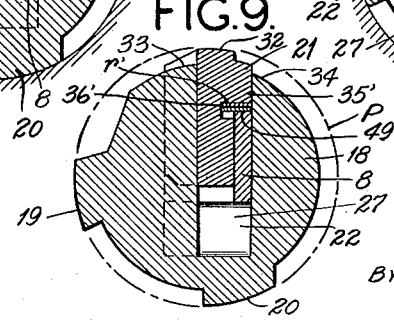
FIG. 9.
INVENTOR:
JOSEPH SUNNEN.
BY Harry
ATTORNEY Patented May 17, 1938

2,117,525

UNITED STATES PATENT OFFICE 2,117,525

REAMER

Joseph Sunnen, Kirkwood, Mo.

Application August 22, 1935, Serial No. 37,306

5 Claims. (Cl. 77—75.5)

My invention has relation to improvements in reamers particularly adapted for the reaming of small holes, and it consists in the novel features of construction more fully set forth in the specification and pointed out in the claims.

The invention is primarily directed to the reaming tool per se which is carried in a mandrel affixed to a machine for rotating the same and controlling the reaming operations. The machine which carries the mandrel forms no part of the present invention but is of the same character as that described and claimed in my copending application Serial No. 17,819, filed April 23, 1935. This machine will, therefore, not be described in detail but only to the extent necessary to understand the operation of the reaming tool.

The principal object of the reaming tool is to provide a cutter associated with suitable guides in the mandrel to insure a smooth cutting operation without undue vibration or chattering that is so prevalent in reamers of this general type.

A further object is to provide a reaming tool wherein the feed of the cutter is capable of minute adjustment and wherein means are provided to prevent accidental biting into the material by the cutter. A further object is to provide a guide that is associated with the cutter in a manner that the cutter may be fed through the work while the guide automatically adjusts itself to the increase in the size of the reamed hole to maintain a snug fit therein for the purpose of guiding the work, and it moves relative to the mandrel in which the reaming tool is mounted.

It is also the object of the present invention to provide positive means for feeding the cutter by pedal action and spring means for automatically retracting the cutter instantaneously on release of the operating pedal. Further and other advantages will be better apparent from a detailed description of the invention in connection with the accompanying drawings, in which:

Figure 1 is a side elevation of a machine similar to that of said application Serial No. 17,819 with my improved reaming tool mounted therein, parts of the machine being broken away so as to show the mechanism thereof in longitudinal section; Fig. 2 is a top plan of the mandrel in which my improved reaming tool is mounted, the chuck in which the mandrel is fixed is shown in section; Fig. 3 is a horizontal, longitudinal section taken through the mandrel on the line 3—3 of Fig. 2; Fig. 4 is an enlarged horizontal, longitudinal section taken on a plane indicated by the line 4—4 of Fig. 2 looking at the reverse side from that shown in Fig. 3 and part of the mandrel broken away; Fig. 5 is a section similar to that shown in Fig. 4, except that the reaming tool has been adjusted to the size of the hole that is to be reamed but with the cutter in the retracted position it occupies before the actuating pedal is depressed; Fig. 6 is a section similar to Fig. 5, except that the cutter has been advanced so as to remove metal from the surface of the hole being reamed because of the depressing of the actuating pedal; Fig. 7 is a cross-sectional detail taken on a plane indicated by the line 7—7 in Fig. 4; Fig. 8 is a cross-sectional detail taken on a plane indicated by the line 8—8 in Fig. 4; Fig. 9 is a cross-sectional detail taken on a plane indicated by the line 9—9 in Fig. 6; Fig. 10 is a cross-sectional detail taken on a plane indicated by the line 10—10 in Fig. 6; Fig. 11 is a perspective view of the cutter detached from the guide with which it is normally associated; Fig. 12 is a side elevation of a guide bar showing the side having the lugs for engagement with the wedge bar; and Fig. 13 is a side elevation of the guide bar looking toward the side opposite of that shown in Fig. 12.

Referring to the drawings, A represents the actuating machine for my improved reaming tool R which is fixed into the chuck C at the outer end of the driving spindle 1 arranged to be driven by a pulley 2, and belt 3 from the pulley 4 of a motor M carried on housing H. A feed rod 5 traverses the hollow spindle 1 and has a yoke 6 swiveled to its rear end and a link 7 fixed to its forward end which link connects said feed rod with a wedge bar 8 for affecting the adjustment of the reaming tool and the feeding of the cutter thereof, as will be more fully described hereinafter. The yoke 6 has pivotal connection at its upper end with an adjustment screw 9, and at its lower end with a link 10 eccentrically connected to a rock shaft 11, to which is also connected a forwardly extending lever 12. The lever 12 is held in its lowermost position with a spring 13 and is adapted to be raised by the downward movement of a pedal 14, to which is connected a belt 15 passing over a pulley 16. The forward end of the feed screw 9 has a dial 17 fixed to it which is graduated so as to effect micro-adjustments of the feed rod 5 by moving the upper end of yoke 6 inwardly or outwardly. The actuating machine thus briefly described, as stated, is the same as that of my co-pending application Serial No. 17,819, and will, therefore, not be described in further detail.

My improved reaming tool R includes a mandrel 18 similar to that shown and described in my co-pending application Serial No. 737,366, filed July 28, 1934. The mandrel 18 has two ribs 19 and 20 integrally formed with it and which project from its outer surface in spaced relation, said ribs to serve the function of guides in cooperation with an adjustable guide 21 mounted in an elongated socket 22 extending longitudinally through the mandrel 18. The outer end of the socket 22 is closed by a wall 23 in which is fixed a pin 24 extending into the socket having a hook 25 mounted on it, said hook being under tension by means of a coiled spring 26 disposed about the pin 24 between the outer end of the hook and head 24' of the pin. There are three substantially uniformly spaced bosses 27, 27, 27 on the bottom of the socket 22 and a lug 28 projects into the socket from one of the side walls thereof a short distance inwardly from the innermost boss 27.

A guide bar 21 is disposed in the socket 22 of the mandrel and has a notch 30 extending across it near the inner end thereof to receive the lug 28 projecting from the side of socket 22. The outer end of the guide bar 21 is provided with a notch 31 for engagement with the hook 25 whereby the bar is held securely and firmly in the socket 22. When the bar is resting on the bosses 27, 27, 27 the top convex surface 32 thereof projects slightly above the adjacent surfaces 33, 34 of the mandrel.

Referring to Fig. 12, it will be seen that one side of bar 21 is provided with bosses 35, 35', the lower inclined edges e, e' of which are notched by recesses r, r' which are formed in the side of the bar 21 for housing springs 36, 36', each of which comprises two convex leaves.

The bottom of each recess is slightly below its adjacent edge e or e' so that the highest point of the springs will project beyond said edges. About midway between the bosses 35, 35' a transverse notch 37 is formed in the bar 21, and on the opposite side of the bar (same side containing the notch 30) is a longitudinally disposed socket 38, the socket being of such depth as to intersect the notch 37 and form the rectangular opening 39 in the middle of the bar. A cutter 40 is disposed in the notch 37 of the bar and has a tongue 41 which projects through the opening 39, said cutter being held in place by a cambered spring 42, the center of which bears against the tongue 41 and ends against the side 43 of the socket 38. The side of the cutter 40 opposite to that contained in the tongue 41 is provided with an inclined lug 44 above which is an offset 45 and lateral offsets 46, 46 for reducing the extent of the cutting edge 47 of the cutter. The wedge bar fits snugly in the socket 22 between guide bar 21 in one side of the socket, said wedge bar having formed in it three inclined surfaces 48, 49 and 50, the first two engaging with springs 36, 36', and the last engaging with the bottom surface of lug 44. The wedge bar rests on the bosses 27, 27, 27 and its inner end terminates in a lip 51 whereby it is coupled to the outer end of link 7 which is provided with a groove 52 for this purpose. It is apparent that by moving the wedge bar 8 outwardly (that is, toward the outer end of the mandrel) the guide bar 21 and the cutter 40 mounted therein will be moved bodily radially of the mandrel.

By referring to Figs. 10 and 11 it will be seen that the cutter 40 has a very narrow land 53 for the cutting edge 47 and the relief 54 behind said land is offset instead of merely inclining away as is the common method of forming cutters of similar character. There is also a well defined rear surface 55 on the land 53, which surface is substantially parallel with the face 56 of the cutter.

The advantage of forming the cutter as just described is that it results in a self-sharpening function and does not require regrinding. This is so because the width of the land 53 is constant although it wears down in use. However, as long as any of the land remains the cutter will continue to cut, and when the land has been completely worn off the cutter has been discarded.

In cutters as ordinarily sharpened, in which the relief is provided by merely beveling the rear part of the cutter, as the cutter wears the land gets wider until it loses its cutting action when it must be restored by regrinding. In my improved cutter the cutting action is not impaired so long as any of the land remains.

We will assume that a connecting rod B is to have its piston pin hole P reamed out for the purpose of receiving a new pin. The operator first adjusts the dial 17 so that the guide bar 21 and, of course, the cutter 40 are retracted to permit the placing of a connecting rod on the mandrel (as shown in Fig. 1). The operator then adjusts the dial 17 so as to take up the clearance between the mandrel 18 and the piston pin hole P. Figure 4 shows the mandrel 18 in the piston pin hole P before this clearance has been taken up. Figure 5 shows the relation of the mandrel to the piston pin hole after having taken up the clearance but before starting the cutting operation. After having taken up the clearance by the adjustment, as mentioned, the operator now depresses the pedal 14 which causes the mandrel 18 to be rotated and at the same time moves the wedge bar 8 outwardly. As the wedge bar 8 is moved outwardly by the feed rod 5 the inclined surfaces 48 and 49 will tend to move the guide bar 21 radially outward, and the inclined surface 50 will move the cutter 40 outwardly. However, the guide bar 21 will be restrained from outward movement by contact with the surface of the pin hole P and will be put under tension by the compression of the springs 36, 36'. On the other hand, the cutter resting solidly on the inclined surface 50 of the wedge bar 8 will be moved outwardly so as to be in a position to ream the opening P to a larger size as the connecting rod B is moved back and forth along the mandrel 18. By referring to Figures 9 and 10 it will be seen that while the cutter is performing its cutting operation the connecting rod is solidly supported on the angularly spaced guide surfaces 19, 20 and guide bar 21.

As soon as the cutter has been passed entirely through the pin hole P, and the hole of course enlarged, the pressure of the springs 36, 36' will cause the guide bar 21 to expand into the enlarged hole so that on the reverse movement of the cutter through the hole the bearing of the connecting rod on the mandrel will be just as substantial as it was before. As rapidly as the cutter is advanced to enlarge the hole P, the guide bar 21 is automatically expanded into the hole so that at no time during the cutting or reaming operation is there such clearance between the mandrel and the hole that is being reamed to permit chattering or relative tilting between the mandrel and the work. The maintaining of contact automatically between the guides and the hole that is being reamed insures a rectilinear movement of the cutter and result in a truly cylindrical hole.

As the cutter is forced radially outwardly to engage the surface of the hole that is being reamed the spring 42 is compressed and just as soon as the pressure is removed from the operating pedal 14 to discontinue the cutting operation the cutter is automatically retracted by the tension of said spring 42.

Having described my invention, I claim:

1. In a reaming tool, a mandrel having a longitudinally disposed slot, a plurality of guide ribs fixed on the outer surface of the mandrel and extending longitudinally thereof, said guide ribs being spaced from the slot and from each other, a guide bar movably held in said slot, a cutting blade associated with the guide bar and in the longitudinal plane thereof, means for moving the guide bar and the cutting blade radially of the mandrel, yielding means between the guide bar and the aforesaid moving means whereby the guide bar has radial movement relative to the cutting blade, and spring means for holding the cutting edge of the cutting blade inside the outer surface of the guide bar when the tool is at rest.

2. In a reaming tool, a mandrel having a longitudinally disposed slot, a plurality of guide ribs fixed on the outer surface of the mandrel and extending longitudinally thereof, said guide ribs being spaced from the slot and from each other, a guide bar movably held in said slot, a cutting blade associated with the guide bar, a wedge bar having inclined surfaces for independently engaging the guide bar and the cutting blade, cushioning means between the guide bar and the wedge bar, the guide bar having radial movement relatively to the cutting blade, and spring means for normally holding the cutting edge of the cutting blade inside the outer surface of the guide bar when the tool is at rest.

3. In a reaming tool, a mandrel having a longitudinally disposed slot, a plurality of guide ribs fixed on the outer surface of the mandrel, said guide ribs being radially spaced from the slot and from each other, a guide bar disposed in said slot, said guide bar having a transverse recess, a cutting blade movably disposed in said recess in normally inoperative relation, adjusting means for radially advancing both the guide bar and the cutting blade, spring elements disposed between the adjusting means and guide bar, and said adjusting means being effective directly on the cutting blade for advancing the cutting blade into operative position with relation to the guide bar on actuating the adjusting means when the guide bar is confined by the work.

4. In a reaming tool, a mandrel having a plurality of longitudinally disposed guide ribs fixed on the outer surface of the mandrel in circumferentially spaced relation, a guide bar mounted longitudinally of said mandrel in spaced relation with the guide ribs and adapted for radial adjustment, a cutting blade associated with the guide bar in normally inoperative relation, means for simultaneously moving the guide bar and the cutting blade radially of the mandrel, said cutting blade having rigid engagement and the guide bar having yielding engagement with the moving means to cause the blade to advance beyond said guide bar when the guide bar yields under the pressure imposed by the work during reaming operations.

5. In a reaming tool, a mandrel having a longitudinally disposed slot, a plurality of guide ribs fixed on the outer surface of the mandrel and extending longitudinally thereof, said guide ribs being spaced from the slot and from each other, a guide bar movably held in said slot, a cutting blade associated with the movable guide bar in normally inoperative relation, a wedge bar mounted in said slot and having inclined surfaces for independently engaging the guide bar and the cutting blade, and yielding means between the guide bar and the wedge bar whereby the latter will advance the blade beyond the guide bar in response to the pressure of the work on said guide bar.

JOSEPH SUNNEN.